June 16, 1964 DE FOREST D. BUTLER 3,137,807
METER SOCKET CONTACT JAW FASTENING MEANS
Filed July 3, 1961
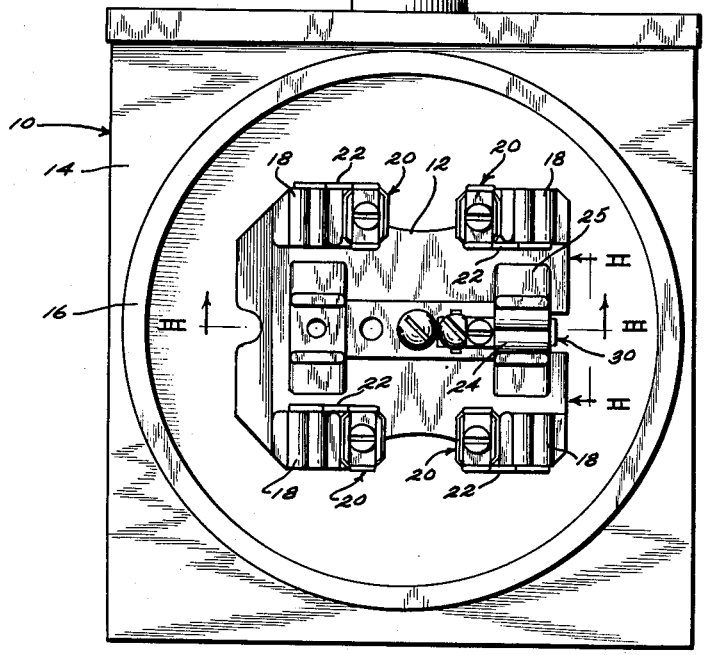
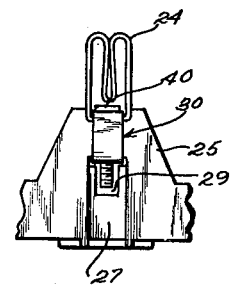
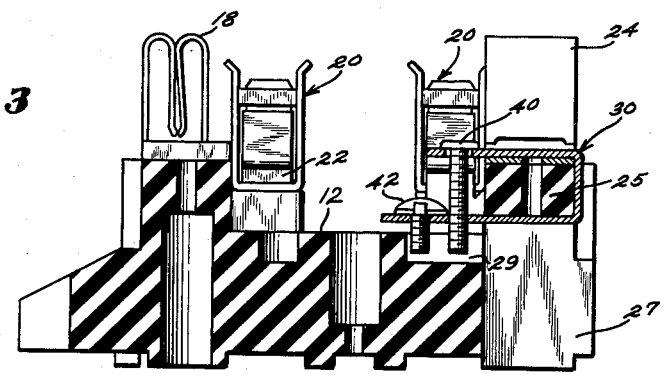
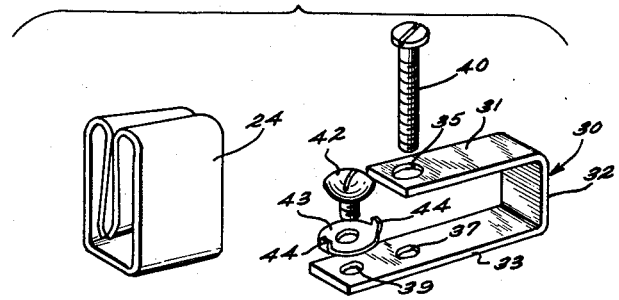
INVENTOR.
DE FOREST D. BUTLER
BY Paul J. Rose
ATTORNEY 3,137,807
METER SOCKET CONTACT JAW
FASTENING MEANS
De Forest D. Butler, Lexington, Ky., assignor to Square D Company, Park Ridge, Ill., a corporation of Michigan
Filed July 3, 1961, Ser. No. 121,675
3 Claims. (Cl. 317—111)

This invention relates generally to sockets for electrical power meters and more particularly to a means of fastening an additional contact jaw to an insulating base, to convert, for example, a four-jaw meter socket to a five-jaw meter socket.

An object of the invention is to provide an improved meter socket.

Another object is to provide a meter socket having improved means for securing an additional contact jaw to the insulating base thereof.

A further object is to provide a meter socket installable with a predetermined number of contact jaws and readily convertible after installation to provide an additional contact jaw without removing the insulating base or the cover thereof and without disturbing the electrical conductors connected to the other contact jaws.

These and other objects will appear from time to time as the following specification proceeds and with reference to the accompanying drawing wherein:

FIGURE 1 is a front elevational view of a meter socket constructed in accordance with the invention and having an additional jaw secured to the insulating base thereof in accordance with the invention;

FIGURE 2 is a fragmentary view of the meter socket taken in the direction of arrows II—II of FIGURE 1;

FIGURE 3 is an enlarged sectional view through the insulating base of the meter socket, taken along the line III—III of FIGURE 1; and FIGURE 4 is an exploded perspective view of the additional contact jaw and the fastening means for securing it to the insulating base of the meter socket in accordance with the invention.

FIGURE 1 shows a box 10 having an insulating base 12 suitably secured therein to a back wall thereof. A front cover 14 of the box has an opening therein defined by a ring flange 16 adapted to have an electrical power meter (not shown) secured thereto.

The insulating base 12 is generally rectangular in shape and is provided with frontwardly extending portions adjacent the corners thereof forming a plurality of platforms for supporting a plurality of contact jaws 18 in position to receive the contact blades (not shown) of an electrical power meter. Additionally, the base 12 has a plurality of platforms for supporting a plurality of electrical connectors 20 respectively associated with the contact jaws 18 and adapted to have the ends of electrical conductors secured therein, as will be understood. A plurality of suitably shaped brackets 22 having portions extending respectively through the contact jaw 18 and the electrical connectors 20 are provided to secure the jaws and connectors to the respective platforms of the base 12, the brackets 22 being secured to the base in any suitable manner, such as by screws (not shown) threaded thereinto from the rear side of the base.

Four contact jaws 18 are sufficient to accommodate a standard electrical power meter having four contact blades. Occasionally, however, it may be desired to install a special electrical power meter having more than four contact blades. Formerly, if a meter socket having four contact jaws 18 was already installed and it was desired to add a fifth contact jaw to accommodate a fifth contact blade of a special meter, it was necessary to remove the base 12 from the box. By the present invention, a fifth contact jaw can be added without removing the base 12 or the cover 14 or anything else from the box and without disturbing any electrical conductors secured in the electrical connectors 20.

FIGURES 1 through 3 show a fifth contact jaw 24, which may be identical to the contact jaws 18, secured to the base 12 in accordance with the invention. For this purpose, the base 12 is provided centrally and adjacent one end with a frontwardly extending generally trapezoidal portion 25 having a front surface grooved to receive the jaw 24. Further, the base 12 is provided with a slot 27 extending from the rear surface thereof forwardly into the portion 25 to form an aperture therethrough, and a groove 29 extending along the front surface thereof and communicating with the slot 27.

A generally U-shaped bracket 30, best shown in FIGURE 4, is provided to secure the contact jaw 24 to the grooved front surface of the portion 25. The bracket 30 has a short leg portion 31, a bight portion 32, and a long leg portion 33. An unthreaded hole 35 is provided adjacent the free end of the leg portion 31 in alignment with a threaded hole 37 provided in the leg portion 33. The leg portion 33 is also provided with a second threaded hole 39 adjacent its free end.

To secure the contact jaw 24 in position, the leg portion 31 is inserted through the contact jaw 24 and the leg portion 33 is inserted through the slot 27 to extend in front of the groove 29, the bight portion 32 abutting the portion 25. A screw 40 is then inserted through the hole 35 and threaded into the hole 37 to urge the free ends of the leg portions 31 and 33 together to clamp the contact jaw 24 against the portion 25. A screw 42 provided with a washer 43 having a pair of upwardly bent ears 44 is threaded into the hole 39 to provide an electrical terminal.

It will be seen that the bracket 30 and the extra contact jaw 24 can be placed in position on the base 12 without removing the base 12 or the cover 14 or anything else from the box 10, and that the screws 40 and 42 can be threaded into the bracket 30 from the front of the box 10. Thus, a very convenient way of adding a fifth contact jaw to a meter socket has been provided. Further, a sixth contact jaw may also be so added by providing a slot and a groove adjacent the other end of the base 12 corresponding to the slot 27 and groove 29.

Various modifications may be made in the structure shown and described without departing from the spirit and scope of the invention.

I claim:

1. In an electrical power meter socket having a box, an insulating base in said box, means securing said base to a back wall of said box, and a predetermined number of contact jaws mounted on said base and adapted to receive a like number of contact blades of an electrical power meter, fastening means securing an additional contact jaw on said base for receiving an additional contact blade of an electrical power meter having said additional contact blade, said fastening means comprising a frontwardly extending portion on said base having an aperture extending transversely therethrough in a direction generally parallel to said back wall of said box and having a supporting surface on the free end thereof supporting said additional contact jaw, a generally U-shaped bracket clamping said additional contact jaw to said supporting surface, said bracket having a bight portion on one side of said frontwardly extending portion of said base and a first leg portion extending from said bight portion through said additional contact jaw in overlying relationship to a portion thereof and to said supporting surface and extending beyond the other side of said frontwardly extending portion of said base opposite said one side and having a second leg portion extending from said bight portion beyond said frontwardly extending portion through said transversely extending aperture thereof, and means urging the free ends of said leg portions of said generally U-shaped bracket toward each other to clamp said additional contact jaw to said supporting surface, said additional contact jaw, bracket, and urging means being securable to said base from the front thereof without disturbing said means securing said base to said back wall.

2. A fastening means as claimed in claim 1, wherein the means urging the free ends of said leg portions of said generally U-shaped bracket toward each other includes a first hole through the part of said first leg portion on said other side of said frontwardly extending portion of said base, a threaded hole opposite said first hole and extending through the part of said second leg portion extending beyond said frontwardly extending portion of said base, and a screw extending through said first hole and threaded into said threaded hole.

3. A fastening means as claimed in claim 1, wherein said second leg portion of said generally U-shaped bracket is longer than said first leg portion to provide an electric terminal adjacent the free end thereof.

References Cited in the file of this patent

UNITED STATES PATENTS

| | | |
|---|---|---|
| 2,154,411 | Road et al. | Apr. 11, 1939 |
| 2,695,923 | Lajeunesse et al. | Nov. 30, 1954 |
| 2,805,403 | Road | Sept. 3, 1957 |